United States Patent
Padiyar

(10) Patent No.: US 9,258,223 B1
(45) Date of Patent: Feb. 9, 2016

(54) PACKET ROUTING IN A NETWORK ADDRESS TRANSLATION NETWORK

(71) Applicant: Amazon Technologies, Inc., Seattle, WA (US)

(72) Inventor: Vinayak Padiyar, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 13/710,885

(22) Filed: Dec. 11, 2012

(51) Int. Cl.
*H04L 12/28* (2006.01)
*H04L 12/56* (2006.01)
*H04L 12/741* (2013.01)
*H04L 12/54* (2013.01)
*H04L 12/935* (2013.01)

(52) U.S. Cl.
CPC ............ *H04L 45/74* (2013.01); *H04L 12/5601* (2013.01); *H04L 45/54* (2013.01); *H04L 49/3009* (2013.01)

(58) Field of Classification Search
CPC .. H04L 45/54; H04L 49/3009; H04L 12/5601
USPC ........ 370/395.31, 351, 352, 353, 401, 395.32
See application file for complete search history.

(56) References Cited

U.S. PATENT DOCUMENTS

| | | | | |
|---|---|---|---|---|
| 7,050,396 B1* | 5/2006 | Cohen et al. | ................... | 370/235 |
| 8,339,959 B1* | 12/2012 | Moisand | ............. | H04L 63/0236 |
| | | | | 370/235 |
| 8,923,308 B2* | 12/2014 | Fok | ....................... | H04W 12/08 |
| | | | | 370/254 |
| 2004/0136356 A1* | 7/2004 | Kuo et al. | ..................... | 370/351 |
| 2004/0165602 A1* | 8/2004 | Park | ........................ | H04L 12/66 |
| | | | | 370/401 |
| 2008/0046142 A1* | 2/2008 | Jordan | ............... | H04L 12/40195 |
| | | | | 701/36 |
| 2009/0144446 A1* | 6/2009 | Olakangil | ............... | H04L 63/14 |
| | | | | 709/239 |
| 2010/0111091 A1* | 5/2010 | Adams et al. | ............ | 370/395.53 |
| 2011/0002339 A1* | 1/2011 | Fok | ........................ | H04W 12/08 |
| | | | | 370/401 |
| 2011/0113455 A1* | 5/2011 | Wu | ....................... | H04L 12/2801 |
| | | | | 725/82 |
| 2012/0110152 A1* | 5/2012 | Wing et al. | .................... | 709/223 |
| 2013/0250955 A1* | 9/2013 | Wang et al. | .................... | 370/392 |
| 2013/0279367 A1* | 10/2013 | Sarikaya | ........... | H04L 29/06068 |
| | | | | 370/254 |

OTHER PUBLICATIONS

U.S. Appl. No. 61/613,131, filed Mar. 20, 2012.*
"Network address translation", Wikipedia [online][retrieved on Oct. 19, 2012]retrieved from: http://en.wikipedia.org/wiki/Network_address_translation 14 pps.

* cited by examiner

Primary Examiner — Chuong T Ho
(74) Attorney, Agent, or Firm — Lee & Hayes, PLLC

(57) ABSTRACT

A differentiated services code point (DSCP) field and a flags field of a data packet are utilized to route the packet in a network address translation (NAT) network. A sending device configures the DSCP field in the packet with information that may be used to identify a destination for the packet within the NAT network. The sending device also configures the flags field to indicate that the DSCP field is to be utilized to identify the destination. When a device in the NAT network receives the packet, the device examines the flag field to determine whether the DSCP field is to be utilized to identify the destination. If the flag indicates that the DSCP field is to be utilized to identify the destination, the DSCP field is utilized to locate the destination network address for the packet. The packet is then transmitted to the identified destination network address.

20 Claims, 5 Drawing Sheets

PACKET ROUTING IN A NETWORK ADDRESS TRANSLATION NETWORK

BACKGROUND

Network address translation ("NAT") is the process of modifying Internet protocol ("IP") address information in IP packet headers while in transit across a network traffic routing device, such as a network router. A "one-to-many" NAT is commonly utilized to hide an entire IP address space, usually consisting of private IP addresses, behind a single IP address in another, commonly public, address space. For example, a one-to-many NAT typically alters higher-level information in outgoing communications, such as transmission control protocol ("TCP") and user datagram protocol ("UDP") ports, and maintains a translation table so that return packets can be correctly translated back. Because a one-to-many NAT is the most common type of NAT, it is often referred to simply as a NAT.

One limitation of current NAT implementations is that the same protocol cannot be multiplexed on the same port using a single NAT external network address. For example, two server computers within a NAT network executing a service that utilizes the same port number cannot be accessed from outside the NAT network when only a single external network address is utilized. As a result, services utilizing the same port number within a NAT network are typically assigned their own external network addresses. This configuration, however, results in the use of additional public network addresses, which might be scarce and/or expensive to obtain.

It is with respect to these and other considerations that the disclosure made herein is presented.

DETAILED DESCRIPTION

Figure 1:
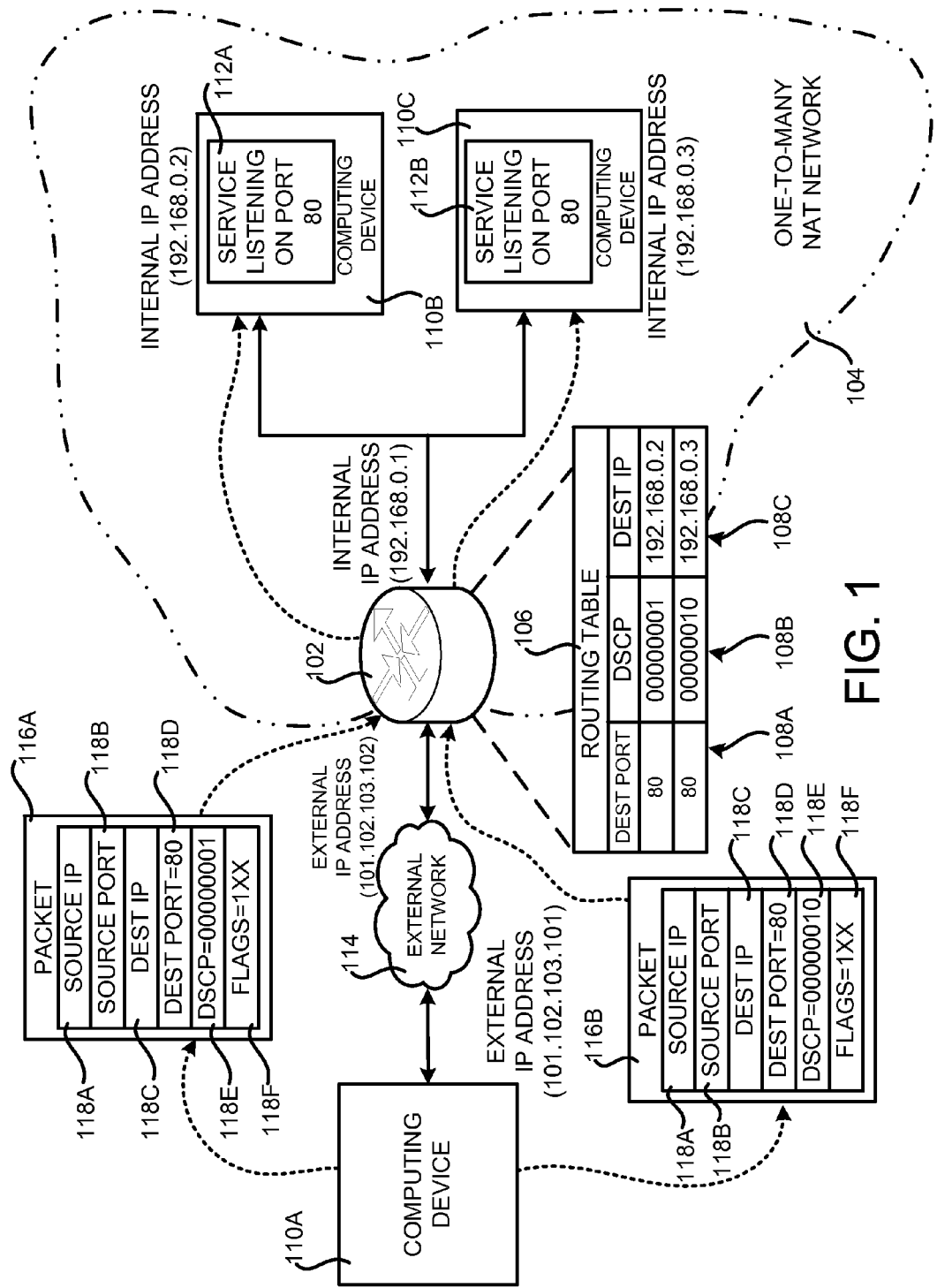
FIG. 1 is a network diagram showing aspects of a mechanism disclosed herein for packet routing in a NAT network, according to one embodiment disclosed herein.

The following detailed description is directed to technologies for packet routing in a NAT network. Utilizing the technologies described herein, data packets can be routed to multiple services in the same NAT network that utilize the same port number. Through the use of such a mechanism, the number of utilized external IP addresses might be reduced. Additional details regarding these and other aspects of the concepts and technologies disclosed herein for data packet routing in a NAT network are provided below.

According to one aspect presented herein, various network-capable computing devices are configured to utilize a differentiated services code point ("DSCP") field and a flags field of IP data packets for use in packet routing in a NAT network, such as a one-to-many NAT network. In order to provide this functionality, a computing device creates a data packet for transmission to a destination address in a NAT network, such as the external IP address utilized by the NAT network. The data packet includes a number of header fields, including the DSCP and flags fields described above.

In order to configure the data packet for routing in the NAT network, the computing device stores data in the DSCP field that provides an indication of the destination network address for the data packet in the NAT network. For example, the computing device might store an eight bit binary number in the DSCP field that corresponds to a network address of the destination for the data packet in the NAT network. As will be described in greater detail below, a computing device in the NAT network, such as a router, can utilize the data stored in the DSCP field to identify the actual destination network address for the data packet in the NAT network.

The computing device also sets a reserved bit in the flags field of the data packet to indicate that data stored in the DSCP field is to be utilized to identify the destination network address for the data packet in the NAT network. As will be described in greater detail below, the device receiving the data packet in the NAT network utilizes the contents of the flags field to determine whether the data packet should be routed utilizing one-to-many NAT or routed to a destination network address that is identified utilizing the data stored in the DSCP field.

When a computing device in the NAT network, such as a router, receives a data packet, the computing device determines whether a destination network address for the data packet is to be identified using the contents of the DSCP field in the data packet. For example, and as described briefly above, the computing device might examine the state of a reserved bit in the flags field to determine whether the destination network address for the data packet is to be identified utilizing the contents of the DSCP field or if the data packet should be routed utilizing one-to-many NAT routing.

If the flags field indicates that the DSCP field should be utilized to determine the destination network address for the data packet, the computing device determines the destination network address utilizing the DSCP field. For example, in one implementation, the computing device is configured to maintain a routing table that includes entries that associate eight bit binary values with destination network addresses in the NAT network. In this embodiment, the computing device compares the contents of the DSCP field of the received data packet to the entries in the routing table. If the flags field indicates that the DSCP field should not be utilized to determine the destination network address for the data packet, the computing device routes the data packet to a destination in the NAT network utilizing one-to-many NAT routing.

If an entry is found in the routing table that matches the data stored in the DSCP field, the computing device utilizes the network address associated with the matching eight bit binary value as the destination network address for the data packet. The computing device might also discard the received data packet if no matching entry is located in the routing table. Additional details regarding the various components and processes described above for data packet routing in a NAT network will be presented below with regard to FIGS. 1-5.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network diagram showing aspects of a mechanism disclosed herein for routing packets in a NAT network, according to one embodiment disclosed herein. As shown in FIG. 1, a router 102 may be configured to perform NAT to route packets within a NAT network, such as the one-to-many NAT network 104. As mentioned above, NAT is the process of modifying IP address information in IP packet headers while in transit across a network traffic routing device, such as the router 102 shown in FIG. 1. A one-to-many NAT is commonly utilized to hide an entire IP address space, usually consisting of private IP addresses, behind a single IP address in another, commonly public, address space. For instance, in the example shown in FIG. 1, the router 102 may be assigned an external IP address (i.e. 101.102.103.102) that is utilized to hide the entire IP address space of the one-to-many NAT network 104 (e.g. the internal 192.168.0.X address space).

As also mentioned above, one limitation of current NAT implementations is that the same protocol cannot be multiplexed on the same port using a single NAT external network address. For example, two server computers within a NAT network executing a service that utilizes the same port number cannot be accessed from outside the NAT network when only a single external network address is utilized. As a result, services utilizing the same port number within a NAT network are typically assigned their own external network addresses. This configuration, however, results in the use of additional public network addresses, which might be scarce and/or expensive to obtain.

Utilizing the technologies described herein, however, data packets can be routed to multiple services in the same NAT network that utilize the same port number. Through the use of such a mechanism, the number of utilized external IP addresses might be reduced. In order to provide this functionality, a computing device sending a data packet, such as the computing device 110A, is configured to format that data packet with data that can be utilized to identify a specific destination within a NAT network, such as the one-to-many NAT network 104. A component operating within the NAT network, such as the router 102, is similarly configured to utilize the data included in the packet by the sender to identify the particular destination network address for the data packet within the NAT network. Additional details regarding these processes will be provided below.

As shown in FIG. 1, and known generally to those skilled in the art, the headers of a data packet 116 in an IP network include a multitude of fields 118. For example, the data packet 116A shown in FIG. 1 includes the fields 118A-118F. The field 118A is utilized to store a source network address for the data packet 116A, the field 118B is utilized to store a source port for the data packet 116A, the field 118C is utilized to store a destination network address for the data packet 116A, the field 118D is utilized to store a destination port for the data packet 116A. The data packet 116B, and all other data packets created according to the Internet Protocol version 4 ("IPv4") standard, also include these fields. The data packets 116 also include other fields and data known to those skilled in the art that have not been shown in FIG. 1.

As also illustrated in FIG. 1, the data packets 116 also include a DSCP field 118E and a flags field 118F. The DSCP field 118E was originally defined as the Type of Service ("TOS") field. However, this field is now defined by RFC2474 for differentiated services. Some technologies require real-time data streaming and, therefore, make use of the DSCP field. An example is Voice over IP ("VoIP"), which is used for interactive data voice exchange. In the embodiments disclosed herein, however, the DSCP field 118E of an IP data packet 116 is not utilized for differentiated services. Rather, and as will be described in detail below, this field is utilized to identify a destination network address for a data packet 116 in a NAT network, such as the one-to-many NAT network 104 shown in FIG. 1.

The flags field 118F is a three-bit field and is typically utilized to control or identify fragments. The bits of this field 118F are: bit 0: unused; bit 1: do not fragment ("DF"); and bit 2: more fragments ("MF"). In the embodiments disclosed herein, the first bit (bit 0) of the flags field 118F is utilized to specify whether the contents of the DSCP field 118E should be utilized to determine a destination network address for a data packet 116 in a NAT network. For example, in embodiments the first bit of the flags field 118F may be set to 0 or 1 to indicate that the contents of the DSCP field 118E should be utilized to identify the destination for a data packet 116 in a NAT network. Additional details regarding this process are described below.

In the illustrative operating environment shown in FIG. 1, the router 102 implements NAT for the one-to-many NAT network 104. In this example, two computing devices 110B and 110C are located within the one-to-many NAT network 104. The computing devices 110B and 110C might be server computers, for example. The computing device 110A has been assigned the internal IP address of 192.168.0.2 and the computing device 110C has been assigned the internal IP address of 192.168.0.3. The router 102 has been assigned the internal IP address of 192.168.0.1 and an external IP address on the external network 114 of 101.102.103.102.

As shown in FIG. 1, a computing device 110A also exists on the external network 114 that has been assigned the IP address of 101.102.103.101. In the example described herein, the computing device 110A is configured to transmit data packets 116 to the computing devices 110B and 110C in the one-to-many NAT network 104. It should be appreciated, however, that the computing devices 110B and 110C might transmit data packets 116 in a similar fashion. It should also be appreciated that the components illustrated in FIG. 1 are merely illustrative and that the embodiments disclosed herein might be utilized with many different components and configurations.

As also shown in FIG. 1, the computing device 110B is configured to execute a service 112A that is listening on port 80. The computing device 110C is also configured to execute a service 112B that is also listening on port 80. In previous implementations of NAT, it was not possible to individually access the services 112A and 112B from outside the one-to-many NAT network 104 because the services 112A and 112B are operating on the same port number. To solve this problem, the computing devices 110B and 110C would have been previously assigned external IP addresses or the port numbers utilized by the services 112A and 112B would have been changed. However, these solutions are not always economically or technically feasible.

The embodiments disclosed herein allow data packets 116 to be routed to different services 112A and 112B that utilize the same port number within the one-to-many NAT network 104. In order to provide this functionality, the router 102, or another component configured to route packets 116 in the one-to-many NAT network 104, is configured with a routing table 106. The routing table 106 might be utilized in addition to the standard NAT tables maintained by a router 102. The routing table 106 includes additional information not maintained by conventional NAT routers that allows data packets 116 to be routed to specific destinations in a one-to-many NAT network 104.

In one embodiment, the routing table 106 includes three fields 108A-108C. The field 108A stores data identifying a destination port for an incoming data packet 116. The field 108B stores an eight bit binary value, and the data field 108C identifies a destination network address in the one-to-many NAT network 104. As will be described in greater detail below, when the router 102 receives a data packet 116, the router utilizes data stored in the flags field 118F to first determine whether data stored in the DSCP field 118E should be utilized to route the data packet 116. If so, the router 102 compares the contents of the DSCP field 118E of the data packet 116 to the contents of the field 108B for each of the entries in the routing table 106. If the data stored in the field 108B of the routing table 106 for one of the entries matches the contents of the DSCP field 118E, the router 102 routes the data packet 116 to the destination network address specified in the field 108C having the matching DSCP value. Additional details regarding this process will be provided below.

In order to transmit a data packet 116 to a destination in the one-to-many NAT network 104, a sending computing device, such as the computing device 110A, formats the data packet 116 with appropriate information in the DSCP field 118E and the flags field 118F. For example, in order to transmit a data packet 116A to the service 112A executing on the computing device 110B, the computing device 110A sets the flags field 118F to indicate that the router 102 should utilize the contents of the DSCP field 118E to identify the destination network address for the data packet 116A. The computing device 110A might set the first bit of the flags field 118F to one in some embodiments to make such a designation. In other embodiments, the computing device 110A might set the first bit of the flags field 118F to zero to indicate that the DSCP field 118E should be utilized to identify the actual destination for the data packet 116A.

The computing device 110A also stores data in the DSCP field 118E for use by the router 102 in identifying the actual destination for the data packet 116A. For example, the computing device 110A might store an eight bit binary value in the DSCP field of the packet 116 that corresponds to an entry in the routing table 106 for the destination. In the example shown in FIG. 1, for instance, the computing device 110A has stored the value '00000001' in the DSCP field 118E, which corresponds to the destination IP address 192.168.0.2 in the routing table 106. In this way, the router 102 will route the data packet 116A to the service 112A listening on port 80 executing on the computing device 110B, which has been assigned the IP address of 192.168.0.2.

In a similar fashion, the computing device 110A might also transmit a data packet 116B to the service 112B, also listening on port 80, executing on the computing device 110C. In this example, the computing device 110A configures the DSCP field 118E of the data packet 116B with the 8-bit binary value '00000010', which corresponds to the IP address 192.168.0.3 in the routing table 106. The computing device 110A also configures the flags field 118F of the data packet 116B to indicate that the contents of the DSCP field 118E of the data packet 116B should be utilized by the router 102 to identify the destination for the data packet 116B. When the router 102 processes the data packet 116B, the packet will be routed to the service 112B listening on port 80 executing on the computing device 110C, which has been assigned the IP address of 192.168.0.3. Additional details regarding the formatting and processing of the data packets 116 for routing the data packets 116 in a NAT network, such as the one-to-many NAT network 104 shown in FIG. 1 will be described below with regard to FIGS. 2-4.

Figure 2:
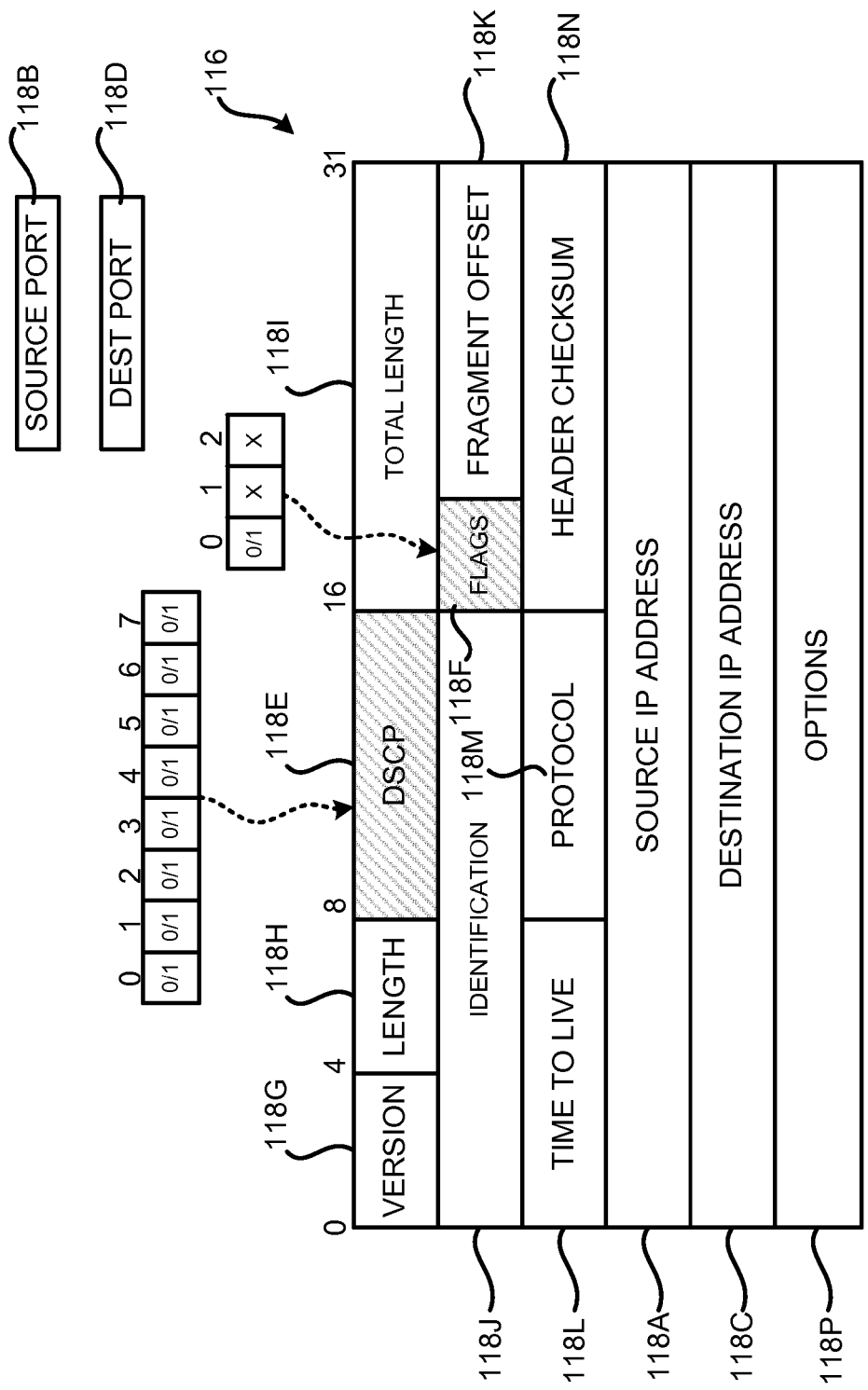
FIG. 2 is a data packet diagram showing aspects of the use of several fields in a data packet for packet routing in a NAT network, according to one embodiment disclosed herein.

FIG. 2 is a data packet diagram showing additional aspects of the use of several fields 118 in the headers of a data packet 116 configured for packet routing in a NAT network 104, according to one embodiment disclosed herein. In particular, FIG. 2 shows various fields 118 contained in the headers of a data packet 116 formatted according to the IPv4 standard. As mentioned above, the data packet 116 includes fields 118A and 118C, respectively, for storing a source IP address and a destination IP address. The data packet 118 also includes fields 118G, 118H, and 118I specifying a version, a length, and a total length, respectively. The other fields 118 in the data packet 116 include a field 118J containing identification information, a field 118K used for fragment offset, a field 118L containing a time to live ("TTL") for the data packet 116, a field 118M specifying the protocol, a field 118N containing a header checksum, and a field 118P specifying options. These fields 118 are well known to those skilled in the art.

As mentioned above, the data packet 116 also includes a DSCP field 118E and a flags field 118F. The DSCP field 118E is intended for use with differentiated services. However, in the embodiments disclosed herein, the field 118E may be utilized to identify a destination network address for a data packet 116 in a NAT network, such as the one-to-many NAT network 104 shown in FIG. 1.

As shown in FIG. 2, the DSCP field 118E is an eight-bit field. Accordingly, the eight bits of the DSCP field 118E might be utilized to specify one of as many as 256 internal IP addresses in the one-to-many NAT network 104. In this regard, a computing device sending a data packet 116 into the one-to-many NAT network 104, such as the computing device 110A, might discover the value to be utilized to transmit a data packet 116 to a particular destination in the one-to-many NAT network 104 in various ways. For example, the router 102 might expose the contents of the routing table 106 to the computing device 110A. The computing device 110A might also determine the value used in the DSCP field 118E to transmit a data packet 116 to a particular destination in the one-to-many NAT network 104 in other ways.

As discussed above, the data packet 116 also includes a flags field 118F. The flags field 118F is a three-bit field and is intended for use in controlling or identifying fragments. As illustrated in FIG. 2, the bits of this field 118F are: bit 0:

unused; bit 1: do not fragment ("DF"); and bit 2: more fragments ("MF"). In the embodiments disclosed herein, the first bit (bit 0) of the flags field 118F is utilized to specify whether the contents of the DSCP field 118E should be utilized to determine a destination network address for a data packet 116 in a NAT network 104. For example, in one implementation, the first bit of the flags field 118F may be set to 0 or 1 to indicate that the contents of the DSCP field 118E should be utilized to identify the destination for a data packet 116 in a NAT network.

It should be appreciated that the data fields 118 for the data packet 116 are merely illustrative and that a data packet 116 might include many more fields than illustrated in FIG. 2. The data packet 116 might also include data and other contents also not shown in FIG. 2. The entire contents of an IPv4 data packet are well known to those skilled in the art and have not been illustrated or described herein.

Figure 3:
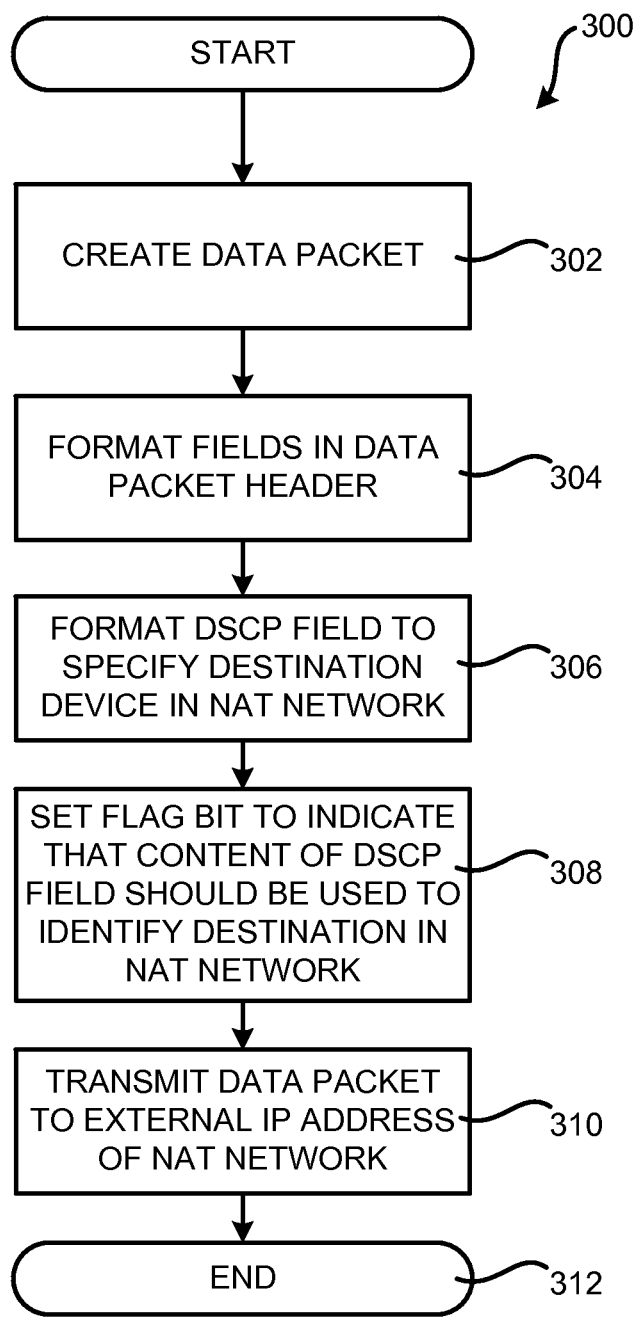
FIG. 3 is a flow diagram showing an illustrative routine for creating and transmitting a data packet to a destination network address in a NAT network that utilizes aspects of the embodiments disclosed herein for packet routing.

FIG. 3 is a flow diagram showing an illustrative routine 300 for creating and transmitting a data packet 116 to a destination network address in a NAT network 104 that utilizes aspects of the embodiments disclosed herein for packet routing. The routine 300 might be implemented by one of the computing devices 110 to create and send a data packet 116 to a NAT network 104 that implements the mechanisms described herein for NAT routing.

It should be appreciated that the logical operations described herein with respect to FIG. 3 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. Some operations might also be performed in parallel, or in a different order than those described herein.

The routine 300 begins at operation 302, where a sender of a data packet 116, such as the computing device 110A, creates a data packet 116. The routine 300 then proceeds to operation 302, where the computing device 110A formats the fields 118 in the header, or headers, of the created data packet 116. For example, the computing device 110A may format the various fields 118 of the data packet 116 described above with regard to FIG. 2. The computing device 110A might also format other fields 118 of the data packet 116, include the data to be transmitted in the data packet 116, and perform other functionality to create the packet 116 to be transmitted.

From operation 304, the routine 300 proceeds to operation 306, where the computing device 110A formats the DSCP field 118E of the data packet 116 to specify the destination in the one-to-many NAT network 104. As mentioned above, this process includes storing an eight-bit binary value in the DSCP field 118E that can be utilized by the router 102 or other device to identify the destination network address for the data packet 116. Once the computing device 110A has generated the contents of the DSCP field 118E, the routine 300 proceeds from operation 306 to operation 308.

At operation 308, the computing device 110A sets bit 0 of the flags field 118F to indicate that the contents of the DSCP field 118E should be utilized to identify a destination network address for the data packet 116. As mentioned above, bit 0 might be set to zero or one in different embodiments to indicate that the contents of the DSCP field 118E should be utilized to identify the destination network address.

From operation 308, the routine 300 proceeds to operation 310, where the computing device 110A transmits the data packet 116 to the one-to-many NAT network 104. For example, the computing device 110A might transmit the data packet 116 to the external IP address of the router 102 in the one-to-many NAT network 104. From operation 310, the routine 300 then proceeds to operation 312, where it ends.

Figure 4:
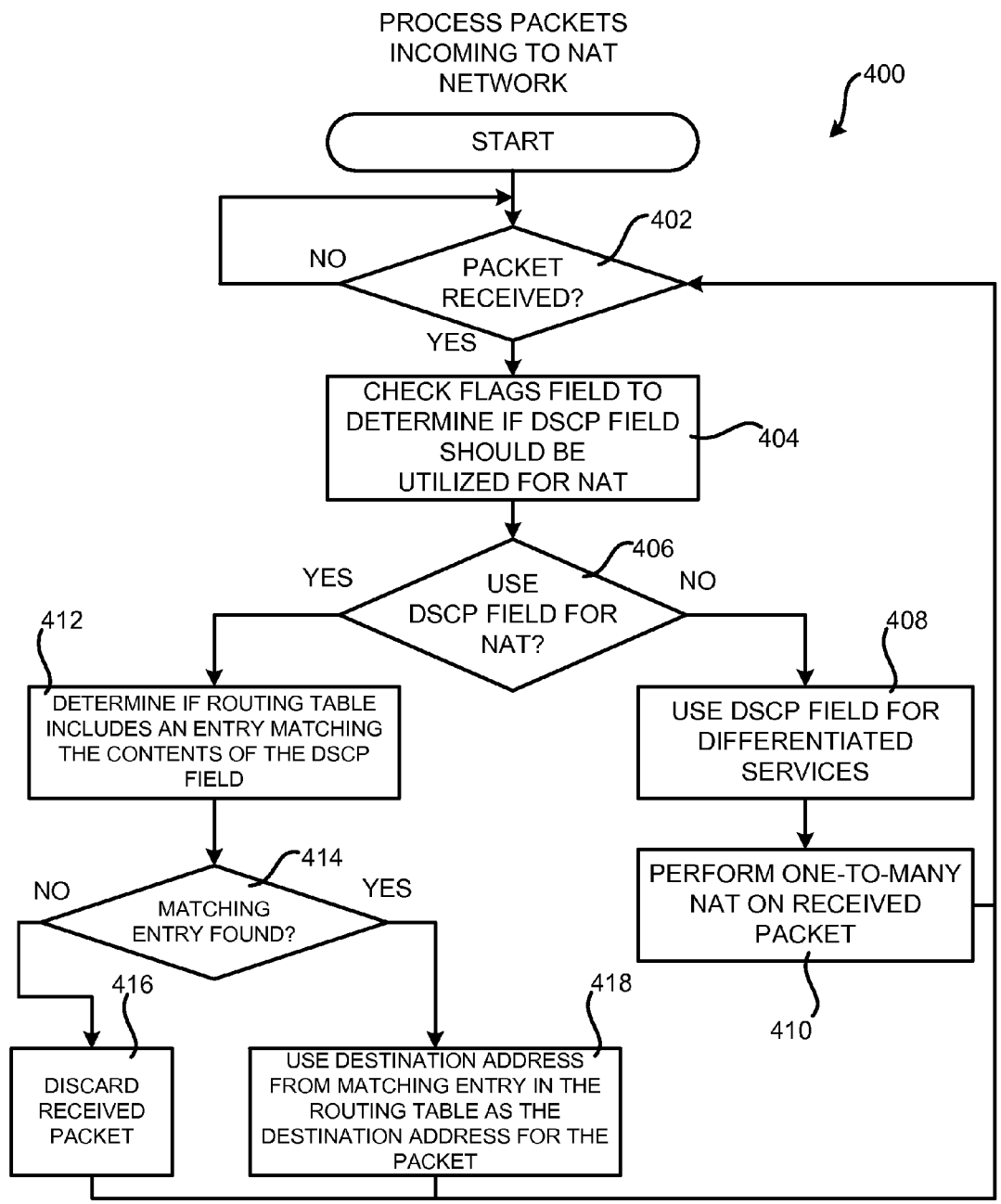
FIG. 4 is a flow diagram showing an illustrative routine for processing incoming data packets that have been configured according to one embodiment disclosed herein for packet routing in a NAT network.

FIG. 4 is a flow diagram showing an illustrative routine 400 for processing incoming data packets 116 that have been configured according to one embodiment disclosed herein for packet routing in a NAT network 104. A router 102 or another device in a NAT network 104 might implement the routine 400 to process incoming data packets 116 and to route the data packets 116 to an intended destination within the NAT network 104 in the manner described below.

The routine 400 begins at operation 402, where the router 102 determines whether a data packet 116 has been received on its interface connected to the external network 114. If a data packet 116 has been received, the routine 400 proceeds to operation 404, where the router 102 checks the contents of the flags field 118F to determine whether the DSCP field 118E of the received data packet 116 should be utilized to identify the destination for the data packet 116. For example, the router 102 might examine bit 0 of the flags field 118F to determine whether the bit has been set in a manner indicating that the DSCP field 118E should be used to identify the destination for the data packet 116.

If the flags field 118F indicates that the DSCP field 118E should be utilized to determine the destination in the NAT network 104 for the data packet 116, the routine 400 proceeds from operation 406 to operation 412. At operation 412, the router 102 determines whether the routing table 106 includes an entry having a field 108B that matches the contents of the DSCP field 108F in the received data packet 116. If no matching entry is found in the routing table 106, the routine 400 proceeds from operation 414 to operation 416, where the router 102 discards, or drops, the received data packet 116. The received data packet 116 is discarded because the flags field 118F of the data packet 116 indicates that the DSCP field 118E should be utilized to route the packet, however, there is no matching entry for the contents of the DSCP field 118E. Consequently, there is no way for the router 102 to determine the destination for the data packet 116, so the data packet 116 is dropped.

If, at operation 414, the router 102 identifies an entry in the routing table 106 having a field 108B that matches the contents of the DSCP field 118E, the routine 400 proceeds from operation 414 to operation 418. At operation 418, the router 102 utilizes the destination network address from the matching entry in the routing table 106 as the destination network address for the received data packet 116. In this regard, the router 102 might modify the destination address stored in the field 118C of the received data packet 116 to reflect the address of the destination computing device 110 in the one-to-many NAT network 104. The router 102 might also modify the data packet 116 in other ways and update its internal routing tables to reflect the routing of the data packet 116. The router 102 then transmits the data packet 116 to its destination within the one-to-many NAT network 104.

If, at operation 406, the router 102 determines that the flags field 118F indicates that the DSCP field 118E should not be utilized to route the data packet 116, the routine 400 proceeds from operation 406 to operation 408. At operation 408, the router 102 may utilize the contents of the DSCP field 118E in its intended manner for differentiated services. The routine 400 then proceeds from operation 408 to operation 410, where the router 102 might route the data packet 116 within the one-to-many NAT network 104 utilizing standard NAT routing. This might include, for instance, utilizing port forwarding or other NAT mechanisms to route the received data packet 116 to a destination within the one-to-many NAT network 104.

From operations 408, 410, 416, 418, the routine 400 proceeds back to operation 402, where additional data packets 116 might be processed in the manner described above. It should be appreciated that additional devices other than the router 102 might perform the processing described above with regard to FIG. 3. Additionally, it should be appreciated that other operations might also be performed in conjunction with those described above in order to process a received data packet 116.

Figure 5:
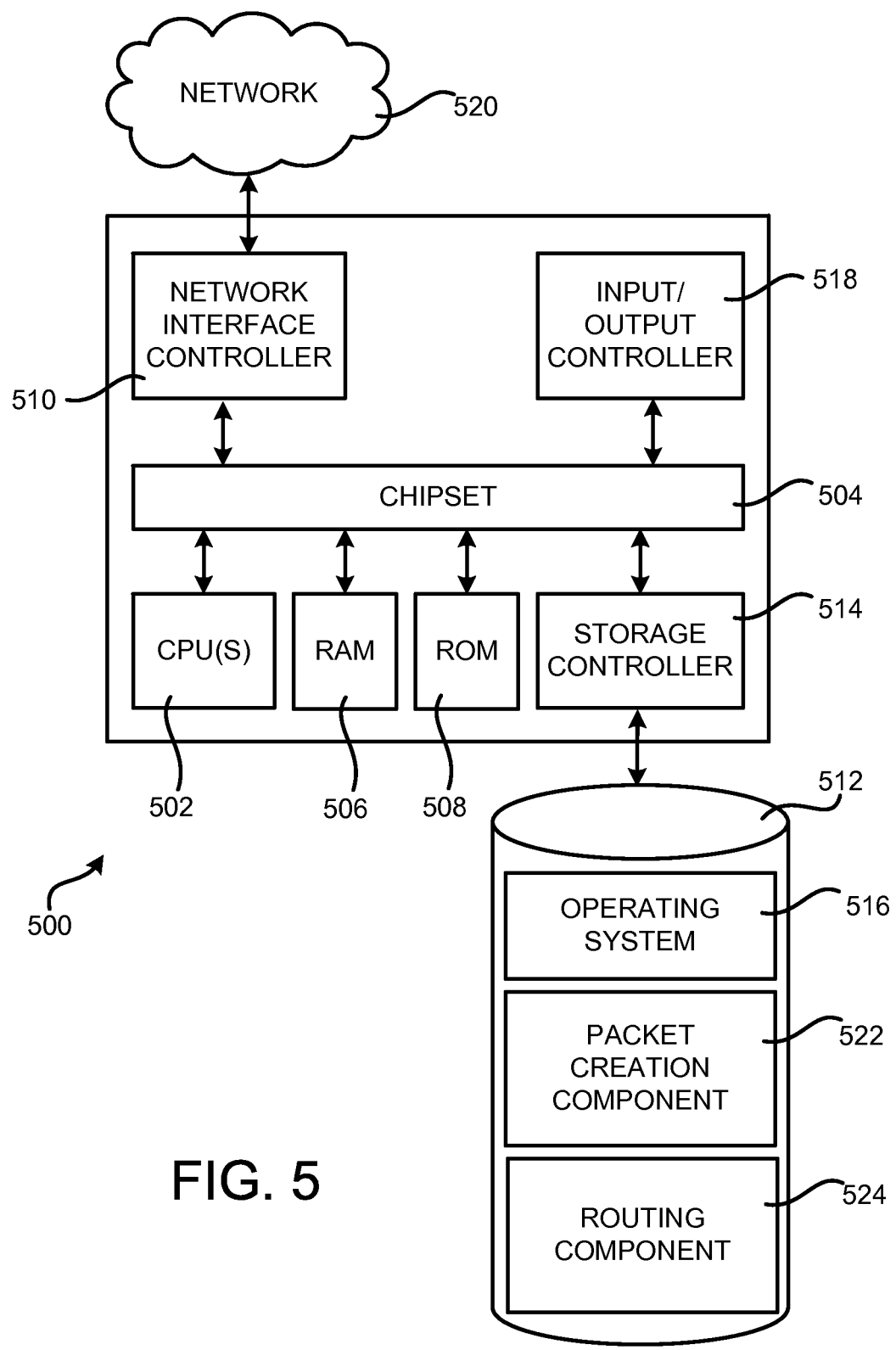
FIG. 5 is a computer architecture diagram showing one illustrative computer hardware architecture for implementing a computing device that might be utilized to implement aspects of the various embodiments presented herein.

FIG. 5 shows an example computer architecture for a computer 500, which might also be referred to as a computing device, capable of executing the program components described above for data packet 116 routing in a NAT network 104. The computer architecture shown in FIG. 5 illustrates a conventional server computer, workstation, desktop computer, laptop, tablet, smartphone, network appliance, personal digital assistant ("PDA"), e-reader, digital cellular phone, router, switch, or other computing device, and may be utilized to execute the various software components presented herein. In particular, the computer architecture shown in FIG. 5 might be utilized to implement a computing device that performs the operations described above with regard to FIG. 3 for transmitting a data packet 116 and/or a computing device, such as the router 102, configured to perform the operations described above with regard to FIG. 4 for routing a data packet 116 utilizing the contents of the DSCP field 118E.

The computer 500 includes a baseboard, or "motherboard," which is a printed circuit board to which a multitude of components or devices may be connected by way of a system bus or other electrical communication paths. In one illustrative embodiment, one or more central processing units ("CPUs") 502 operate in conjunction with a chipset 504. The CPUs 502 may be standard programmable processors that perform arithmetic and logical operations necessary for the operation of the computer 500.

The CPUs 502 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 504 provides an interface between the CPUs 502 and the remainder of the components and devices on the baseboard. The chipset 504 may provide an interface to a random access memory ("RAM") 506, used as the main memory in the computer 500. The chipset 504 may further provide an interface to a computer-readable storage medium such as a read-only memory ("ROM") 508 or non-volatile RAM ("NVRAM") for storing basic routines that help to startup the computer 500 and to transfer information between the various components and devices. The ROM 508 or NVRAM may also store other software components necessary for the operation of the computer 500 in accordance with the embodiments described herein.

The computer 500 may operate in a networked environment using logical connections to remote computing devices and computer systems through a network 520, such as the external network 114 and the NAT network 104 described above. The chipset 504 may include functionality for providing network connectivity through a NIC 510, such as a gigabit Ethernet adapter. The NIC 510 is capable of connecting the computer 500 to other computing devices over the network 520. It should be appreciated that multiple NICs 510 may be present in the computer 500, connecting the computer to other types of networks and remote computer systems.

The computer 500 may be connected to a mass storage device 512 that provides non-volatile storage for the computer. The mass storage device 512 may store system programs, application programs, other program modules, and data, which have been described in greater detail herein. The mass storage device 512 may be connected to the computer 500 through a storage controller 514 connected to the chipset 504. The mass storage device 512 may consist of one or more physical storage units. The storage controller 514 may interface with the physical storage units through a serial attached SCSI ("SAS") interface, a serial advanced technology attachment ("SATA") interface, a Fibre Channel ("FC") interface, or other type of interface for physically connecting and transferring data between computers and physical storage units.

The computer 500 may store data on the mass storage device 512 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 512 is characterized as primary or secondary storage, and the like.

For example, the computer 500 may store information to the mass storage device 512 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 512 by detecting the physical states or characteristics of one or more particular locations within the physical storage units.

In addition to the mass storage device 512 described above, the computer 500 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 512 may store an operating system 516 utilized to control the operation of the computer 500. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 512 may store other system or application programs and data utilized to provide the functionality described above. For example, the mass storage device 512 might store a packet creation component 522 configured to generate and transmit a data packet 116 in the manner described above with regard to FIG. 3. The mass storage device 512 might also store a routing component 524 configured to route data packets 116 in the manner described above with regard to FIG. 4. The mass storage device 512 might also store other programs and data not specifically identified herein.

In one embodiment, the mass storage device 512 or other computer-readable storage media is encoded with computer-executable instructions which, when loaded into the computer 500, transforms the computer from a general-purpose computing system into a special-purpose computer capable of implementing the embodiments described herein. These computer-executable instructions transform the computer 500 by specifying how the CPUs 502 transition between states, as described above. According to one embodiment, the computer 500 has access to computer-readable storage media storing computer-executable instructions which, when executed by the computer 500, perform the routines 300 and 400, described above with regard to FIGS. 3 and 4, respectively.

The computer 500 may also include an input/output controller 518 for receiving and processing input from a number of input devices, such as a keyboard, a mouse, a touchpad, a touch screen, an electronic stylus, or other type of input device. Similarly, the input/output controller 518 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5. For example, the computer 500 might be implemented utilizing a system on a chip ("SOC") architecture or a custom hardware architecture in other implementations.

Based on the foregoing, it should be appreciated that technologies for data packet routing in a NAT network have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computing device, cause the computing device to:
   receive a data packet;
   examine a state of a reserved bit in a flags field of a packet header for the data packet to determine that the data packet is to be routed to a destination in a network address translation (NAT) network;
   retrieve data stored in a differentiated services code point (DSCP) field of the data packet;
   use the data stored in the DSCP field to identify the destination network address for the destination for the data packet in the NAT network; and
   transmit the data packet to the destination network address for the destination in the NAT network.

2. The non-transitory computer-readable storage medium of claim 1, wherein the computer-executable instructions stored thereupon which, when executed by the computing device, further cause the computing device to maintain a routing table comprising one or more entries that associate eight bit binary values with destination network addresses in the NAT network.

3. The non-transitory computer-readable storage medium of claim 2, wherein utilizing use the data stored in the DSCP field to identify the destination network address for the data packet comprises identifying an eight bit binary value stored in the routing table that matches the data stored in the DSCP field of the data packet, and utilizing the network address in the NAT network associated with the matching eight bit binary value as the destination network address for the data packet.

4. The non-transitory computer-readable storage medium of claim 3, wherein the computer-executable instructions stored thereupon which, when executed by the computing device, further cause the computing device to in response to determining that an eight bit binary value is not found in the routing table that matches the data stored in the DSCP field of the data packet, cause the computing device to discard the data packet.

5. The non-transitory computer-readable storage medium of claim 1, wherein use the data stored in the DSCP field to identify the destination network address for the data packet comprises identifying a value stored in a routing table based, at least in part, on the data stored in the DSCP field of the data packet, and utilizing the value as the destination network address for the data packet.

6. The non-transitory computer-readable storage medium of claim 5, wherein the computer-executable instructions stored thereupon which, when executed by the computing device, further cause the computing device to route the data packet to a destination in the NAT network utilizing one-to-many NAT routing in response to determining that the reserved bit in the flags field of the data packet indicates that the data stored in the DSCP field of the data packet should not be utilized to route the data packet to the destination in the NAT network.

7. A computer-implemented method for packet routing in a one-to-many network address translation (NAT) network, the method comprising performing computer-implemented operations for:
 creating a data packet for transmission to a destination network address in the NAT network, the data packet comprising a packet header having a differentiated services code point (DSCP) field;
 storing data in the DSCP field of the packet header to provide an indication of the destination network address for the data packet in the NAT network;
 transmitting the data packet to an external network address associated with the NAT network;
 receiving the data packet;
 determining that the data packet is to be routed to a destination in the NAT network using data stored in the DSCP field of the data packet;
 examining a state of a reserved bit of a flags field of the packet header for the data packet to determine that the data packet is to be routed to the destination in the NAT network using data stored in the DSCP field of the data packet;
 retrieving the data stored in the DSCP field of the data packet;
 utilizing the data stored in the DSCP field of the data packet to identify the destination network address associated with the data stored in the DSCP field of the data packet for the destination for the packet in the NAT network; and
 transmitting the packet to the identified destination network address for the destination in the NAT network.

8. The computer-implemented method of claim 7, further comprising setting a reserved bit in a flags field of the packet header to indicate to a NAT router that the data stored in the DSCP field of the data packet is to be utilized to identify the destination network address for the data packet in the NAT network.

9. The computer-implemented method of claim 7, wherein the data stored in the DSCP field of the packet header comprises an eight bit binary value corresponding to the destination network address in the NAT network, and wherein the NAT router can utilize the eight bit binary value to identify the destination network address utilizing a routing table.

10. A non-transitory computer-readable storage medium having computer-executable instructions stored thereupon which, when executed by a computing device, cause the device to:
 store data in a differentiated services code point (DSCP) field of a packet header of a data packet for use in identifying a destination network address for the data packet in a one-to-many network address translation (NAT) network;
 set a bit in a flags field of the packet header to indicate that the data stored in the DSCP field of the data packet is to be utilized to identify the destination network address for the data packet in the NAT network;
 transmit the data packet to an external network address associated with the NAT network;
 receive the data packet;
 determine that the data packet is to be routed to a destination in the NAT network using data stored in the DSCP field of the data packet;
 retrieve the data stored in the DSCP field of the data packet;
 utilize the data stored in the DSCP field of the data packet to attempt to identify the destination network address associated with the data stored in the DSCP field of the data packet for the destination for the packet in the NAT network; and
 transmit the packet to the identified destination network address for the destination in the NAT network in response to determining that the network address is identified.

11. The non-transitory computer-readable storage medium of claim 10, wherein retrieve the data stored in the DSCP field of the data packet comprises to determine a value of the data stored in the DSCP field.

12. The non-transitory computer-readable storage medium of claim 10, wherein the data stored in the DSCP field of the packet header comprises an eight bit binary value.

13. An apparatus, comprising:
 a processor;
 a plurality of network interfaces; and
 a computer-readable storage medium having computer-executable instructions stored thereupon which, when executed by the processor, cause the processor to
 receive a data packet on one of the network interfaces,
 examine a state of a reserved bit in a flags field of a packet header of the data packet to determine that a destination network address for the data packet is to be identified using data stored in a differentiated services code point (DSCP) field,
 identify the destination network address for the data packet using the data stored in the DSCP field of the data packet, and
 transmit the data packet on one of the network interfaces to the identified destination network address.

14. The apparatus of claim 13, wherein identify the destination network address for the data packet using the data stored in the DSCP field of the data packet comprises using a value of the data stored in the DSCP field of the data packet.

15. The apparatus of claim 14, having a routing table stored in the computer-readable storage medium, the routing table comprising a plurality of entries each of which associates an eight bit binary value with a destination network addresses.

16. The apparatus of claim 15, wherein identify the destination network address for the data packet using the data stored in the DSCP field of the data packet comprises identifying an eight bit binary value stored in the routing table that matches the data stored in the DSCP field of the data packet, and utilizing the network address associated with the matching eight bit binary value as the destination network address for the data packet.

17. The apparatus of claim 16, wherein the computer-executable instructions further cause the processor to, in response to determining that an eight bit binary value is not found in the routing table that matches the data stored in the DSCP field of the data packet, cause the processor to discard the data packet.

18. The apparatus of claim 17, wherein the destination network address is located in a one-to-many network address translation (NAT) network.

19. The apparatus of claim 18, wherein the computer-executable instructions further cause the processor to route the data packet to a destination in the one-to-many NAT network utilizing one-to-many NAT routing in response to determining that the state of the reserved bit in the flags field of the data packet indicates that the destination network address for the data packet is not to be identified using data stored in the DSCP field.

20. The apparatus of claim 19, wherein the data packet is received from a computing device configured to store the data in the DSCP field to provide an indication of the destination network address for the data packet, and to set the state of the reserved bit in the flags field of the data packet to indicate that the destination network address for the data packet is to be identified using data stored in the DSCP field.

* * * * *